United States Patent
Yin et al.

(10) Patent No.: US 11,321,734 B2
(45) Date of Patent: May 3, 2022

(54) INFORMATION PROCESSING METHOD, SERVER, AND COMPUTER STORAGE MEDIUM

(71) Applicant: TENCENT TECHNOLOGY (SHENZHEN) COMPANY LIMITED, Guangdong (CN)

(72) Inventors: Peng Yin, Shenzhen (CN); Qian Wang, Shenzhen (CN); Jun Xian Guo, Shenzhen (CN); Dong Yang, Shenzhen (CN); Can Zheng, Shenzhen (CN); Yuan Wang, Shenzhen (CN); Rong Yan, Shenzhen (CN); Hui Liu, Shenzhen (CN); Chen Jun Yang, Shenzhen (CN); Cheng Chen, Shenzhen (CN); Zhou Zhou, Shenzhen (CN); Shao Gang Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 179 days.

(21) Appl. No.: 16/010,592

(22) Filed: Jun. 18, 2018

(65) Prior Publication Data

US 2018/0300752 A1    Oct. 18, 2018

Related U.S. Application Data

(63) Continuation of application No. PCT/CN2017/079500, filed on Apr. 5, 2017.

(30) Foreign Application Priority Data

Apr. 15, 2016   (CN) .......................... 201610235725.8

(51) Int. Cl.
*G06Q 30/02* (2012.01)
*G06F 16/955* (2019.01)
(Continued)

(52) U.S. Cl.
CPC ..... *G06Q 30/0246* (2013.01); *G06F 16/9554* (2019.01); *G06Q 50/01* (2013.01);
(Continued)

(58) Field of Classification Search
CPC .... G06Q 30/02; G06Q 30/0246; G06Q 50/01; G06F 16/9554; G06K 7/1417; H04L 67/22
See application file for complete search history.

(56) References Cited

U.S. PATENT DOCUMENTS

| 2013/0006848 A1* | 1/2013 | Kuttuva | G06Q 20/3223 |
| | | | 705/39 |
| 2014/0067958 A1* | 3/2014 | Bradley | H04L 67/306 |
| | | | 709/204 |

(Continued)

FOREIGN PATENT DOCUMENTS

| CN | 102868696 A | 1/2013 |
| CN | 103279881 A | 9/2013 |

(Continued)

OTHER PUBLICATIONS

Wang et al., "The Communication Design of WeChat: Ideological as Well as Technical Aspects of Social Media" (published in Communication Design Quarterly, vol. 4, Issue 1, Nov. 2015, pp. 23-35) (Year: 2015).*

(Continued)

*Primary Examiner* — Abhishek Vyas
*Assistant Examiner* — Patrick Kim
(74) *Attorney, Agent, or Firm* — Sughrue Mion, PLLC

(57) ABSTRACT

An information processing method, a server, and a computer storage medium are provided. The method includes: generating a first information identification code according to first information, the first information representing an information source; providing the first information identification (Continued)

code to a terminal; receiving a first request from the terminal and allowing a terminal user of the terminal to follow an information service, the first request carrying the first information; and recording the first information and tracking and obtaining conversion information of the information source according to the first information.

17 Claims, 12 Drawing Sheets

(51) Int. Cl.
*G06Q 50/00* (2012.01)
*G06K 7/14* (2006.01)
*H04L 29/06* (2006.01)
*H04L 9/40* (2022.01)
*G06F 16/27* (2019.01)
*H04W 12/77* (2021.01)
*H04L 67/10* (2022.01)

(52) U.S. Cl.
CPC .......... *H04L 63/00* (2013.01); *H04L 63/1408* (2013.01); *G06F 16/27* (2019.01); *G06K 7/1417* (2013.01); *H04L 67/10* (2013.01); *H04W 12/77* (2021.01)

(56) References Cited

U.S. PATENT DOCUMENTS

| | | | |
|---|---|---|---|
| 2015/0134402 A1 | 5/2015 | Barbieri et al. | |
| 2015/0262221 A1* | 9/2015 | Nakano | G06Q 30/0275 705/14.45 |
| 2015/0312038 A1* | 10/2015 | Palanisamy | G06Q 20/385 713/155 |

FOREIGN PATENT DOCUMENTS

| | | |
|---|---|---|
| CN | 104036415 A | 9/2014 |
| CN | 104091277 A | 10/2014 |
| CN | 104639513 A | 5/2015 |
| CN | 104702629 A | 6/2015 |
| CN | 104881437 A | 9/2015 |
| CN | 104966211 A | 10/2015 |
| CN | 104966218 A | 10/2015 |
| CN | 105404982 A | 3/2016 |
| CN | 105491008 A | 4/2016 |
| CN | 105763635 A | 7/2016 |
| JP | 2009288906 A | 12/2009 |
| JP | 2010079804 A | 4/2010 |

OTHER PUBLICATIONS

Communication dated Dec. 31, 2019 from the State Intellectual Property Office of the P.R.C. in counterpart Application No. 201610235725.8.

Communication dated Oct. 14, 2019 from the State Intellectual Property Office of the P.R.C. in application No. 201610235725.8.

International Search Report for PCT/CN2017/079500 dated Jun. 1, 2017 [PCT/ISA/210].

Notice of Reason(s) for Rejection dated Jul. 16, 2019 from the Japanese Patent Office in application No. 2018-532204.

Written Opinion, dated Jun. 1, 2017 from the International Bureau in counterpart International application No. PCT/CN2017/079500.

Office Action dated Mar. 16, 2020 in Chinese Application No. 201610235725.8.

* cited by examiner

INFORMATION PROCESSING METHOD, SERVER, AND COMPUTER STORAGE MEDIUM

CROSS REFERENCE TO RELATED APPLICATIONS

This application is a continuation of International Application No. PCT/CN2017/079500, filed on Apr. 5, 2017 in the Chinese Patent Office, which claims priority from Chinese Patent Application No. 2016102357258, filed on Apr. 15, 2016 in the Chinese Patent Office, the disclosures of which are incorporated herein by reference in their entireties

BACKGROUND

1. Field

The present disclosure relates to communications technologies, and in particular, to an information processing method, a server, and a computer storage medium.

2. Description of Related Art

In an information interaction process, information about each of loops of information interaction needs to be tracked, so as to perform analysis according to the information, and to ensure an accurate final processing result. Using an information source loop at a front end of a whole information link of information interaction as an example, a related art technical solution of tracking a user conversion source has, for example, a manner of sharing cookies.

A specific implementation of the manner of sharing cookies is: user personal information, such as a user name and a password of the user and which websites the user accesses, when the user logs in to a browser the last time may be saved by using cookies (or referred to as a browser cache) on a personal computer (PC). Considering demands of protecting security and privacy of the user personal information, the user may finally empty cookies after exiting browsing web pages. There is a same processing manner for using cookies on a mobile terminal, which helps protection of user information and makes the user information securer. However, with the development of a multi-terminal and/or multi-platform technology, the user may wish to synchronize and update in real time data of multiple terminals and/or multiple platforms during information interaction, so as to track the data. When the user conversion source is tracked in the manner of sharing cookies, because of the foregoing features of the cookies, when information interaction is performed on two different platforms, a PC terminal and the mobile terminal, a problem arises that data on the two platforms are asynchronous, which does not comply with demands of data synchronization and real-time update across multiple terminals and/or across multiple platforms. The asynchronization brings more obstacles to tracking of the user conversion source, causing inaccuracy of tracking of data or failing to implement tracking.

The related art technology does not provide any effective solution to solve the foregoing problem.

SUMMARY

In view of the above, embodiments intend to provide an information processing method, a server, and a computer storage medium, so as to solve at least a problem in the related art technology.

According to an aspect of an exemplary embodiment, provided is an information processing method, the method including: generating a first information identification code according to first information, the first information representing an information source; providing the first information identification code to a terminal; receiving a first request from the terminal and allowing a terminal user of the terminal to follow an information service, the first request carrying the first information; and recording the first information and tracking and obtaining conversion information of the information source according to the first information.

According to another aspect of an exemplary embodiment, provided is a server, the server including: at least one memory operable to store program code; and at least one processor operable to read the program code, and operate as instructed by the program code, the program code including: first identification code generation code configured to cause at least one of said at least one processor to generate a first information identification code according to first information and providing the first information identification code to a terminal, the first information representing an information source; and first processing code configured to cause at least one of said at least one processor to: receive a first request from the terminal and allow a terminal user of the terminal to follow an information service, the first request carrying the first information; and record the first information and track and obtain conversion information of the information source according to the first information.

According to another aspect of an exemplary embodiment, provided is a non-transitory computer storage medium, the computer storage medium storing computer executable instructions, which, when executed by a computing apparatus, cause the computing apparatus to: generate a first information identification code according to first information, the first information representing an information source; provide the first information identification code to a terminal; receive a first request from the terminal and allow a terminal user of the terminal to follow an information service, the first request carrying the first information; and record the first information and track and obtain conversion information of the information source according to the first information.

When performing processing, the first identification code generation coded and the first processing code may be executed by using a central processing unit (CPU), a digital signal processor (DSP), or a field-programmable gate array (FPGA).

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

Implementation of the technical solutions is further described in detail below with reference to the accompanying drawings.

To enable a person skilled in the art to better understand the solutions, the following clearly and completely describes the technical solutions in the exemplary embodiments with reference to the accompanying drawings. Apparently, the described embodiments are merely some but not all of the embodiments of the disclosure. All other embodiments that can be obtained by a person of ordinary skill in the art based on the embodiments described herein without creative efforts shall fall within the protection scope of the disclosure.

It should be noted that in the specification, the claims, and the accompanying drawings, the terms "first", "second", and so on are intended to distinguish between similar objects, rather than indicate a specific order or a time order. It should be understood that such used data can be exchanged with each other in appropriate cases, so that the embodiments that are described herein can be implemented in a sequence other than the sequences shown in the figures or described herein. Moreover, the terms "include", "have" and any variant thereof mean to cover the non-exclusive inclusion. For example, in the context of a process, method, system, product or device that includes a series of steps or units, the process, method, system, product or device is not necessarily limited to the clearly listed steps or units, and instead, includes other steps or units not specified clearly, or may include inherent steps or units of the process, method, product, or device.

The "unit" or "module" used herein may be a hardware component such as a processor or a circuit, and/or a software component that is executed by a hardware component such as a processor.

Figure 1:
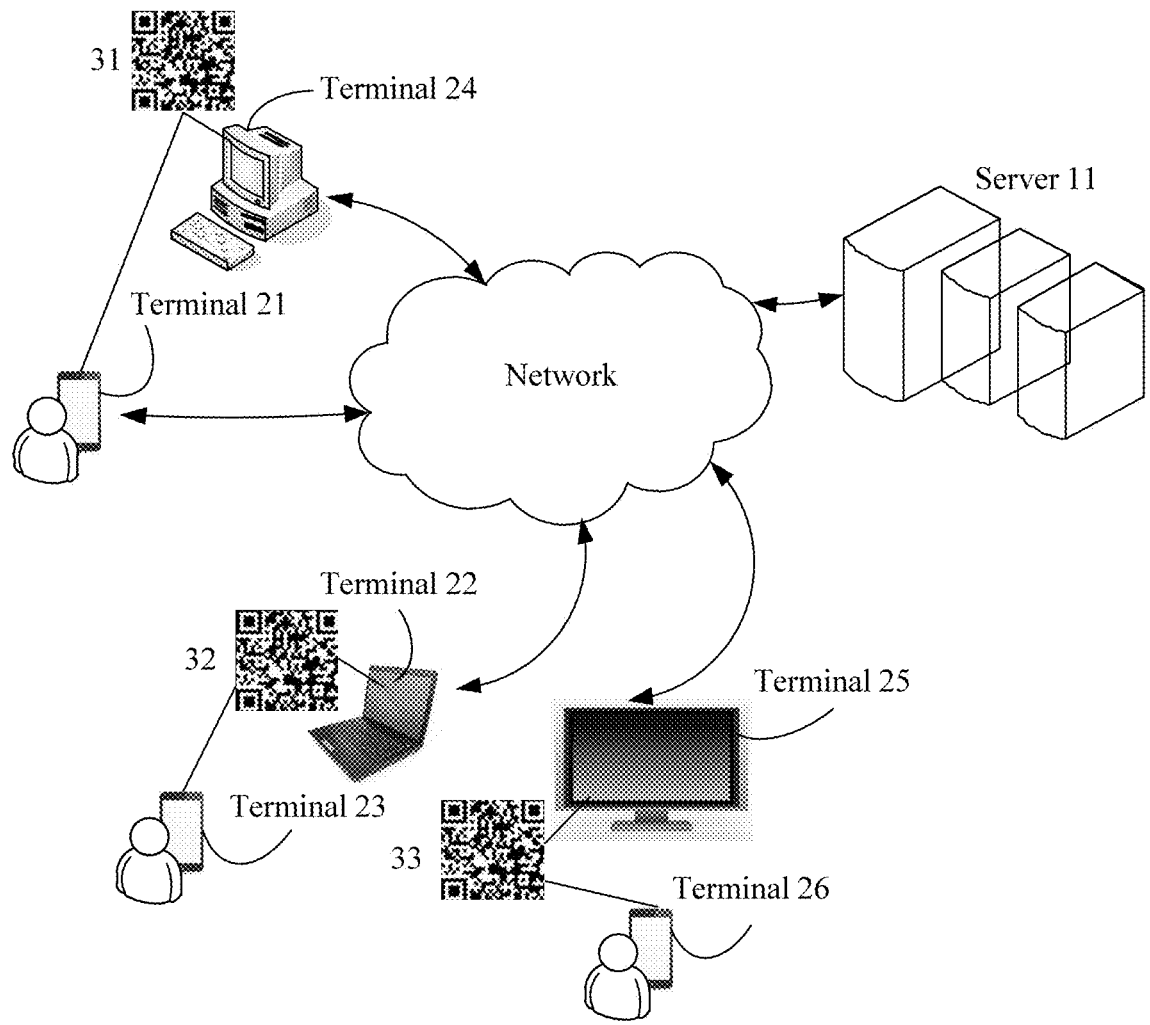
FIG. 1 is a schematic diagram of hardware entities for information interaction according to an exemplary embodiment.

FIG. 1 is a schematic diagram of hardware entities for information interaction according to an exemplary embodiment.

A server 11 (such as a server cluster provided by multiple servers), terminal devices 21-26 (including types such as a desktop computer, a PC, a mobile phone, and an all-in-one computer), and two-dimensional codes 31-33 obtained by the terminal devices from a third-party channel are included in FIG. 1. The two-dimensional codes 31-33 are generated by the server 11, and the terminal devices 21-26 perform information interaction with the server 11 by using a wired network and/or a wireless network.

After the terminal devices scan the two-dimensional codes 31-33 to obtain specified information required by tracking of data, the server tracks data in real time according to the specified information and synchronously tracks the obtained data in real time on multiple terminals and/or multiple platforms. Each user may use data synchronization and real-time update across multiple terminals and/or across multiple platforms. Using a terminal group (e.g., the terminal 21 and the terminal 24) in FIG. 1 as an example, the terminal 21 logs in to a browser and enters the third-party channel and scans a two-dimensional code on the third-party channel, so that the server 11 records and tracks, based on the two-dimensional code, from which the terminal 21 obtains channel information of the two-dimensional code, or may track all user behaviors executed by the user.

A user behavior executed by the terminal 24 when logging in to a browser is recorded, and the information may be synchronized. A problem of asynchronization of data of multiple platforms existing when information interaction is performed on different platforms such as a desktop computer, a PC terminal, all-in-one computer and a mobile terminal can be avoided, so as to improve accuracy of real-time tracking, and accurately obtain information that needs to be tracked, such as channel information or a user behavior executed after a user account logs in.

Using the channel information as an example, the server generates a dyeing identification code (or referred to as a dyeing two-dimensional code) in a two-dimensional code form according to a dyeing code representing a channel information source. The terminal starts an application (such as a WeChat application), performs an operation of scanning the dyeing two-dimensional code, triggers scanning the dyeing two-dimensional code, and obtains through parsing the dyeing code in the dyeing two-dimensional code. The terminal receives a WeChat advertisement social information service interface, triggers a corresponding following operation according to prompt information in the WeChat advertisement social information service interface prompting whether to follow an official account of WeChat advertisement social information, and generates a follow request for following a WeChat advertisement social information service, the follow request carrying the dyeing code. The server receives the follow request, accepts following of the WeChat advertisement social information from a terminal user and records the dyeing code, so as to successfully implement dyeing processing, so as to subsequently track and obtain conversion information (e.g., conversion information such as from which channels which users obtain the dyeing two-dimensional code and a total user quantity of these users) of the channel information source according to the dyeing code.

The foregoing example in FIG. 1 is only an example of a system architecture for implementing an exemplary embodiment, and the disclosure is not limited to the system structure in FIG. 1. The exemplary embodiments may be provided based on the system architecture.

Also, for illustrative purposes, an application scenario in which an application program installed on a user terminal is WeChat is described as an example in the exemplary embodiments described herein. However, it should be noted that the disclosure is not limited thereto and can be applied to any application programs other than WeChat.

Embodiment 1

Figure 2:
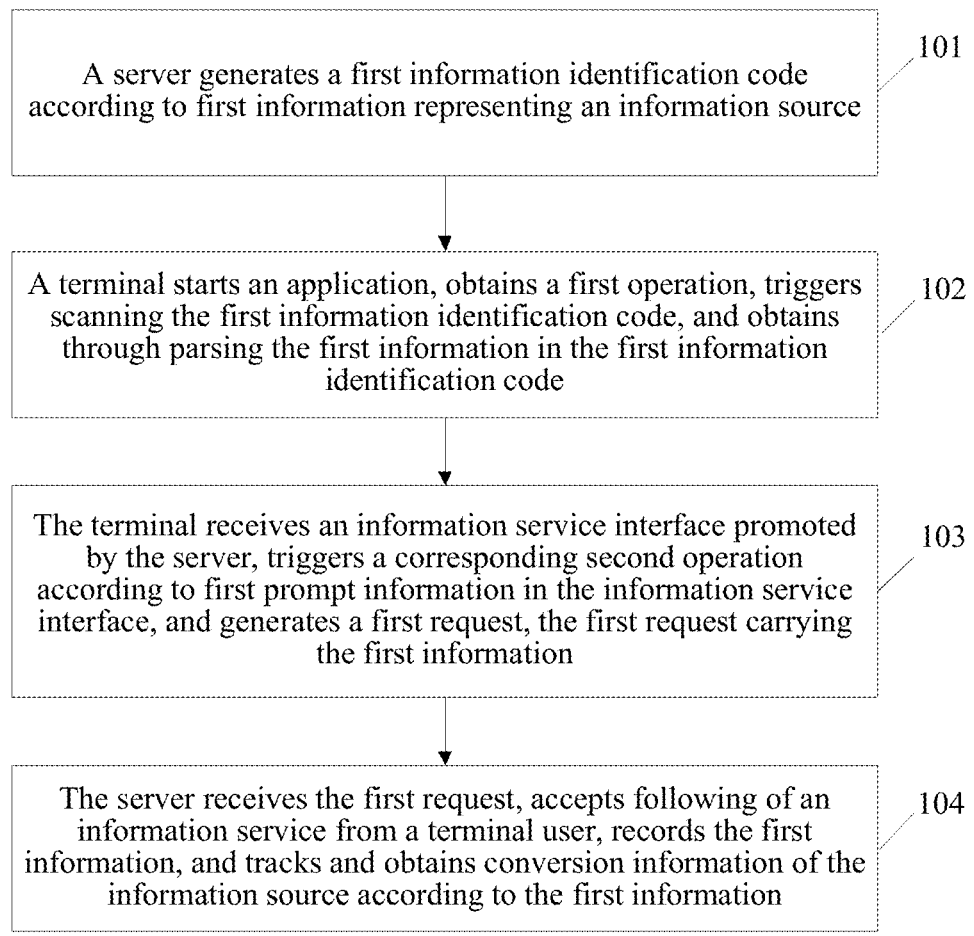
FIG. 2 is a schematic diagram of an implementation flow according to an exemplary embodiment.
Figure 3:
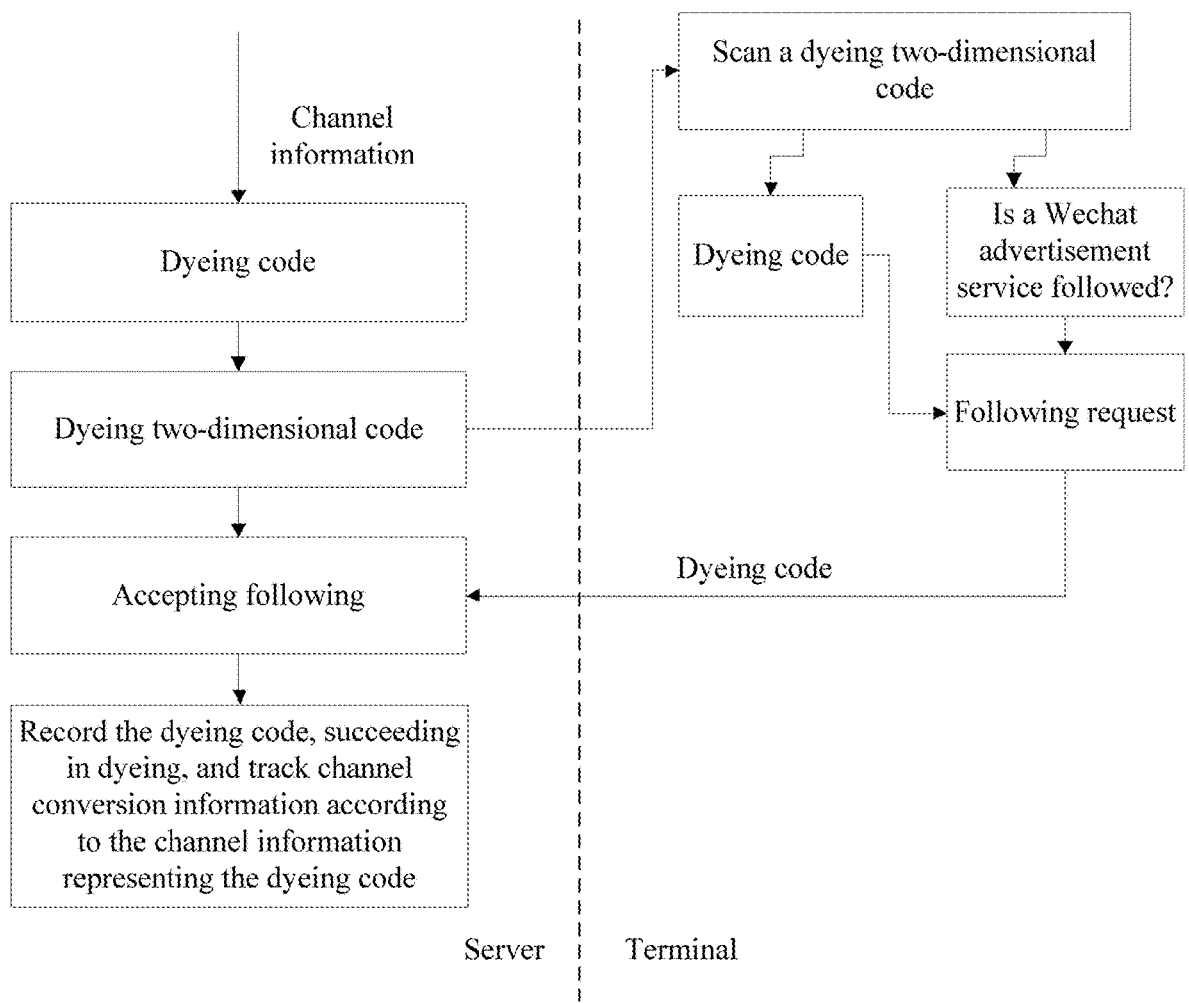
FIG. 3 is a schematic diagram of an implementation flow of implementing information tracking by scanning a dyeing two-dimensional code according to an exemplary embodiment.
Figure 4:
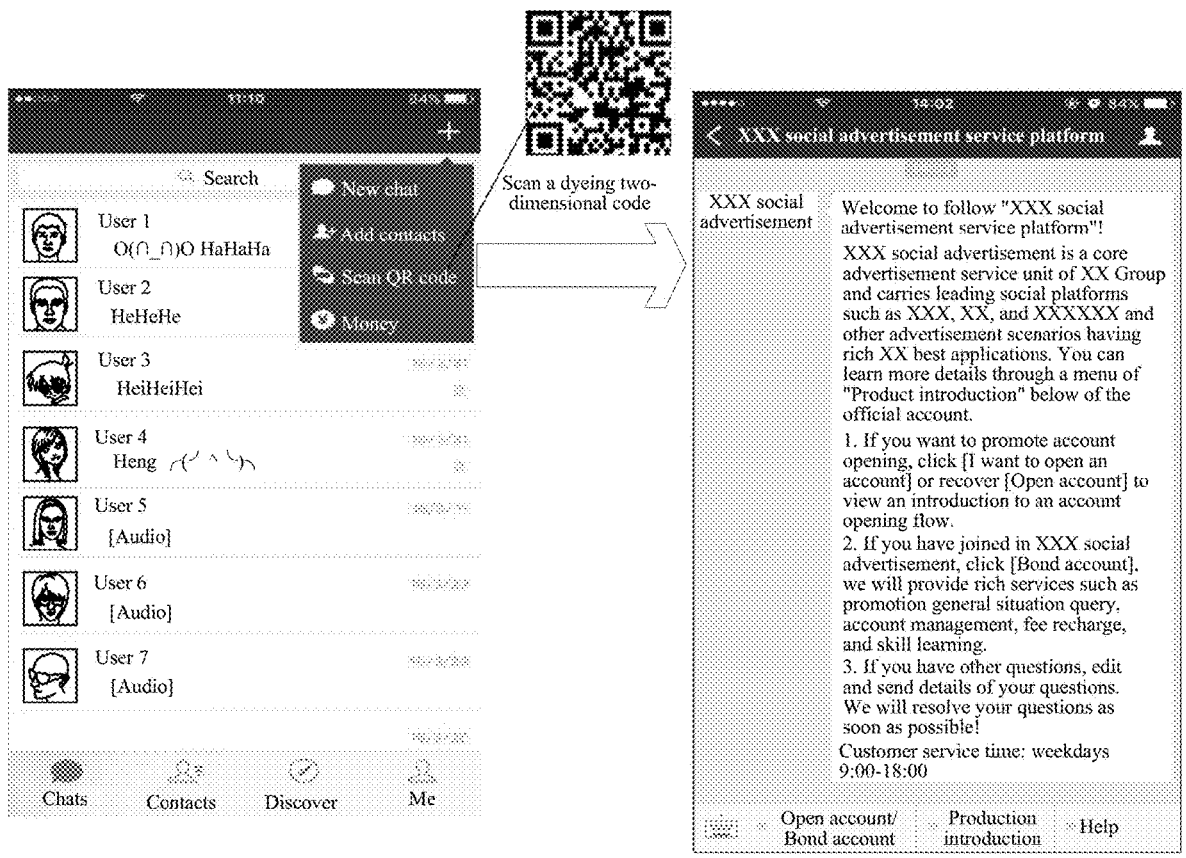
FIG. 4 is a schematic diagram of a user interface of a social application obtained by scanning a dyeing two-dimensional code according to an exemplary embodiment.

An exemplary embodiment provides an information processing method. FIG. 2 is a schematic diagram of an implementation flow according to an exemplary embodiment. FIG. 3 is a schematic diagram of an implementation flow of implementing information tracking by scanning a dyeing two-dimensional code according to an exemplary embodiment. FIG. 4 is a schematic diagram of a user interface of a social application obtained by scanning a dyeing two-dimensional code according to an exemplary embodiment.

As shown in FIG. 2, the method includes:

Step 101: A server generates a first information identification code according to first information representing an information source.

Herein, as shown in FIG. 3, using an example in which the information source is channel information, a dyeing identification code (or referred to as a dyeing two-dimensional code) in a two-dimensional code form is generated according to a dyeing code representing the channel information. The channel information is promotion channel information corresponding to promotion of an advertisement platform that needs to be followed, and is, for example, an advertisement promotion website.

Step 102: A terminal starts an application, obtains a first operation, triggers scanning the first information identification code, and obtains through parsing the first information in the first information identification code.

Herein, in an example of FIG. 3, after starting the social application (such as a WeChat application), the terminal performs an operation of scanning the dyeing two-dimensional code on a user interface (as shown in FIG. 4) of the social application, triggers scanning the dyeing two-dimensional code, and obtains through parsing the dyeing code representing the channel information from the dyeing two-dimensional code.

Step 103: The terminal receives an information service interface promoted by the server, triggers a corresponding second operation according to first prompt information in the information service interface, and generates a first request, the first request carrying the first information.

Herein, in an example of FIG. 3, after receiving the first prompt information (such as prompt information prompting whether to follow an official account of WeChat advertisement social information) on the user interface (as shown in FIG. 4) of the social application, the terminal triggers a corresponding following operation, and generates a follow request for following a WeChat advertisement social information service, the follow request carrying the dyeing code.

Herein, the dyeing two-dimensional code may also be a non-login-state two-dimensional code, distinguishable from a subsequent login-state two-dimensional code. An application scenario corresponding to the non-login-state two-dimensional code includes a situation in which when a user (such as an advertiser) is not registered yet and is only in a state of following the official account of the WeChat advertisement social information, the user only becomes a follower of the official account of the WeChat advertisement social information. In this case, because registration is not conducted by using a user account (such as a QQ account) of the user, the user account (such as a QQ account) is not associated with a personal WeChat account of the user.

An application scenario corresponding to the login-state two-dimensional code includes a situation in which after the user follows the official account of the WeChat advertisement social information, the user has become a follower of the official account of the WeChat advertisement social information and has registered user personal information or once has a login record in the official account of the WeChat advertisement social information. In this case, because registration is conducted by using the user account (such as a QQ account) of the user, the user account (such as a QQ account) is automatically associated with the personal WeChat account of the user. Therefore, a subsequent user pushes information needed by the user to the user by using the personal WeChat account of the user in a preset manner (e.g., regularly or periodically).

Step 104: The server receives the first request, accepts following of an information service from a terminal user, records the first information, and tracks and obtains conversion information of the information source according to the first information.

Herein, the server receives the follow request, accepts following of the WeChat advertisement social information from the terminal user, and records the dyeing code, to successfully implement dyeing processing, so as to subsequently track and obtain conversion information (such as channel conversion information, specifically conversion information such as from which channels which users obtain the dyeing two-dimensional code and a total user quantity of these users) of a channel information source according to the dyeing code.

According to an exemplary embodiment, a complete information interaction flow is: a server generates a two-dimensional code (such as a dyeing two-dimensional code); a terminal scans the two-dimensional code; the server tracks the two-dimensional code, implementing real-time tracking of channel information based on a dyeing code in the dyeing two-dimensional code and data synchronization and real-time update of real-time data tracking across multiple terminals and/or multiple platforms, so that the server can accurately record, track, and collect statistics on channel conversion information. That is, when a user scans a dyeing two-dimensional code and becomes a WeChat follower, the server records a dyeing code of the dyeing two-dimensional code, to successfully perform dyeing processing on the user, and finally tracking the user in a whole course by using the dyeing code, thereby implementing conversion and track of advertiser channel information based on the dyeing two-dimensional code.

In an implementation, the conversion information of the information source in step 104 includes, but not limited to: a user quantity of terminal users that are converted into at least one terminal by using at least one information channel, that is, tracking and collecting statistics on, according to the first information, the user quantity of advertisers that are converted by channels into a mobile terminal.

Embodiment 2

An exemplary embodiment provides an information processing method, the method including:

Step 201: A server generates a first information identification code according to first information representing an information source.

Herein, as shown in FIG. 3, in an example in which the information source is channel information, a dyeing identification code (or referred to as a dyeing two-dimensional code) in a two-dimensional code form is generated according to a dyeing code representing the channel information. The channel information is promotion channel information corresponding to promotion of an advertisement platform that needs to be followed, and is, for example, an advertisement promotion website.

Step 202: A terminal starts an application, obtains a first operation, triggers scanning the first information identification code, and obtains through parsing the first information in the first information identification code.

Herein, in an example of FIG. 3, after starting the social application (such as a WeChat application), the terminal performs an operation of scanning the dyeing two-dimensional code on a user interface (as shown in FIG. 4) of the social application, triggers scanning the dyeing two-dimensional code, and obtains through parsing the dyeing code representing the channel information from the dyeing two-dimensional code.

Step 203: The server identifies the terminal user according to the first information to obtain an information source of the first information identification code.

Step 204: The terminal receives an information service interface promoted by the server, triggers a corresponding second operation according to first prompt information in the information service interface, and generates a first request, the first request carrying the first information.

Herein, in an example of FIG. 3, after receiving the first prompt information (such as prompt information prompting whether to follow an official account of WeChat advertisement social information) on the user interface (as shown in FIG. 4) of the social application, the terminal triggers a corresponding following operation, and generates a follow request for following a WeChat advertisement social information service, the follow request carrying the dyeing code.

Herein, the dyeing two-dimensional code may also be a non-login-state two-dimensional code, distinguishable from a subsequent login-state two-dimensional code. An application scenario corresponding to the non-login-state two-dimensional code includes a situation in which when a user (such as an advertiser) is not registered yet and is only in a state of following the official account of the WeChat advertisement social information, the user only becomes a follower of the official account of the WeChat advertisement social information. In this case, because registration is not conducted by using a user account (such as a QQ account) of the user, the user account (such as a QQ account) is not associated with a personal WeChat account of the user. An application scenario corresponding to the login-state two-dimensional code is a situation in which after the user follows the official account of the WeChat advertisement social information, the user has become a follower of the official account of the WeChat advertisement social information and has registered user personal information or once has a login record in the official account of the WeChat advertisement social information.

In this case, because registration is conducted by using the user account (such as a QQ account) of the user, the user account (such as a QQ account) is automatically associated with the personal WeChat account of the user. Therefore, a subsequent user pushes information needed by the user to the user by using the personal WeChat account of the user in a preset manner (e.g., regularly or periodically).

Step 205: The server receives the first request, accepts following of an information service from a terminal user, records the first information, and tracks and obtains conversion information of the information source according to the first information.

Herein, the server receives the follow request, accepts following of the WeChat advertisement social information from the terminal user, and records the dyeing code, to successfully implement dyeing processing, so as to subsequently track and obtain conversion information (such as channel conversion information, specifically conversion information such as from which channels which users obtain the dyeing two-dimensional code and a total user quantity of these users) of a channel information source according to the dyeing code.

According to an exemplary embodiment, a complete information interaction flow is: a server generates a two-dimensional code (such as a dyeing two-dimensional code); a terminal scans the two-dimensional code; the server tracks the two-dimensional code, implementing real-time tracking of channel information based on a dyeing code in the dyeing two-dimensional code and data synchronization and real-time update of real-time data tracking across multiple terminals and/or multiple platforms, so that the server can accurately record, track, and collect statistics on channel conversion information. That is, when a user scans a dyeing two-dimensional code and becomes a WeChat follower, the server records a dyeing code of the dyeing two-dimensional code, to successfully perform dyeing processing on the user, and finally tracking the user in a whole course by using the dyeing code, thereby implementing conversion and track of advertiser channel information based on the dyeing two-dimensional code.

In an implementation, the conversion information of the information source in step 205 includes, but not limited to: a user quantity of terminal users that are converted into at least one terminal by using at least one information channel, that is, tracking and collecting statistics on, according to the first information, the user quantity of advertisers that are converted by channels into a mobile terminal.

Embodiment 3

Figure 5:
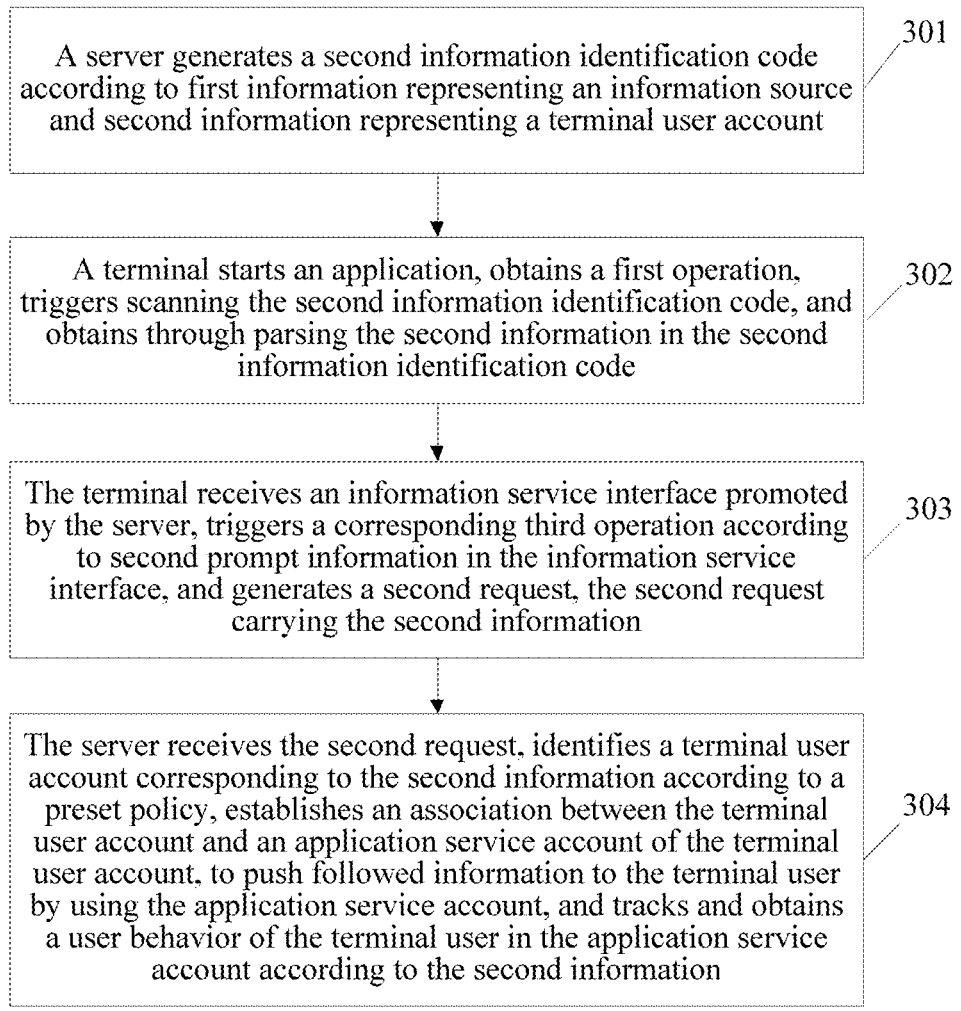
FIG. 5 is a schematic diagram of an implementation flow according to Embodiment 3.

FIG. 5 is a schematic diagram of an implementation flow according to Embodiment 3.

An exemplary embodiment provides an information processing method. As shown in FIG. 5, the method includes:

Step 301: A server generates a second information identification code according to first information representing an information source and second information representing a terminal user account.

Figure 6:
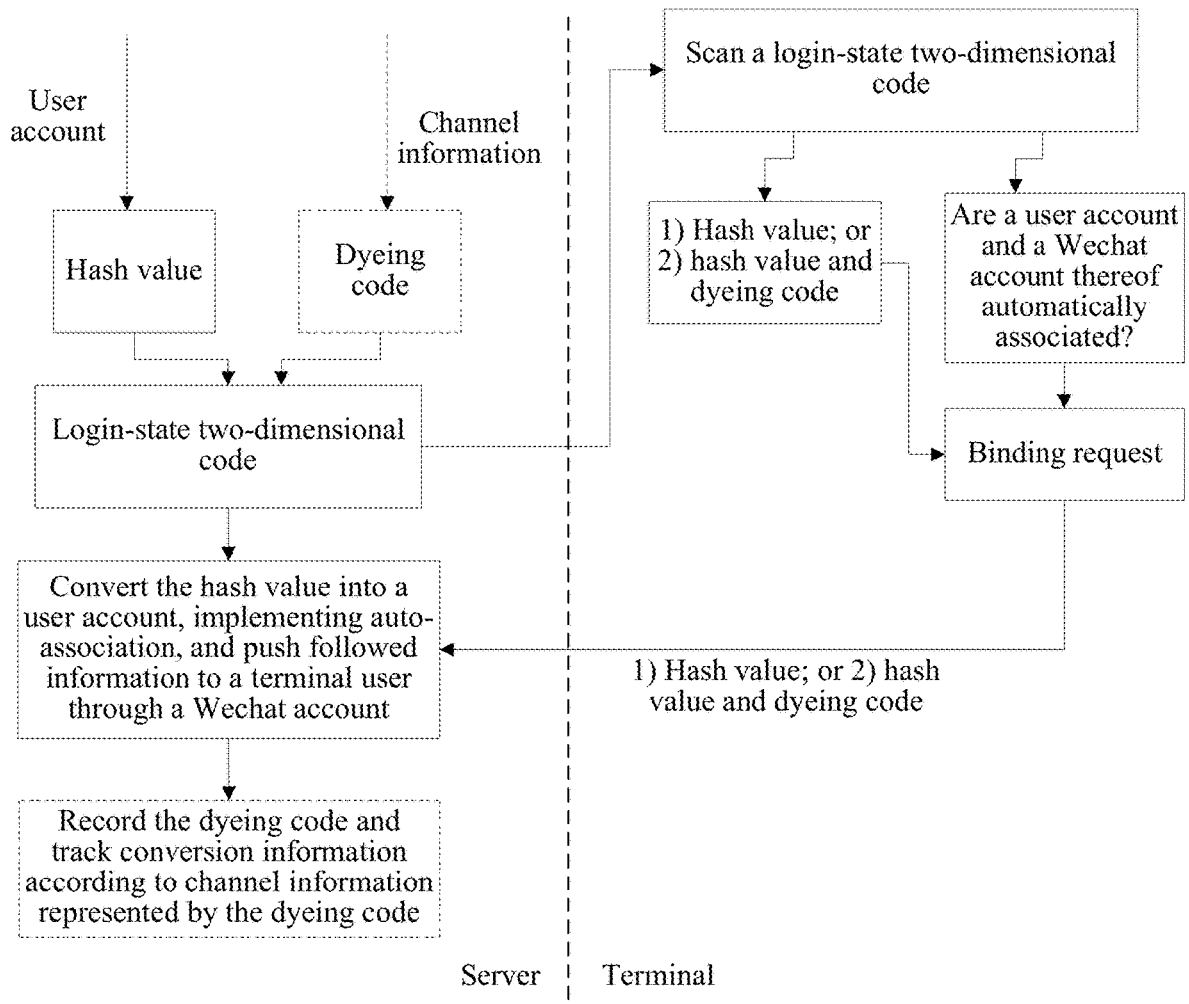
FIG. 6 is a schematic diagram of an implementation flow of implementing information tracking by scanning a login-state two-dimensional code according to an exemplary embodiment.
Figure 7:
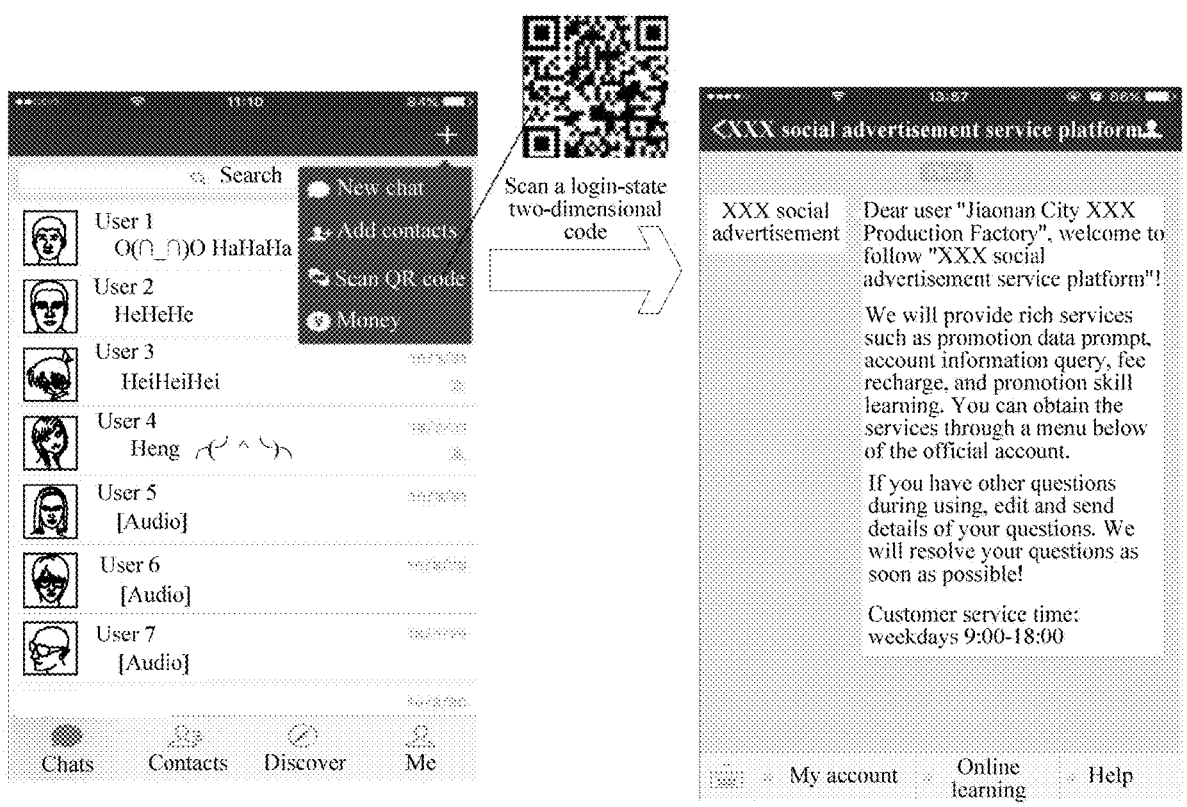
FIG. 7 is a schematic diagram of a user interface of a social application obtained by scanning a login-state two-dimensional code according to an exemplary embodiment.

FIG. 6 is a schematic diagram of an implementation flow of implementing information tracking by scanning a login-state two-dimensional code according to an exemplary embodiment. FIG. 7 is a schematic diagram of a user interface of a social application obtained by scanning a login-state two-dimensional code according to an exemplary embodiment.

Herein, as shown in FIG. 6, using an example in which the information source is channel information, a login-state two-dimensional code is generated according to a dyeing code representing the channel information and a hash value representing the terminal user account. The channel information is promotion channel information corresponding to promotion of an advertisement platform that needs to be followed, and is, for example, an advertisement promotion website. The second information representing the terminal user account is a hash value corresponding to the terminal user account and is not real user information (such as a QQ account).

Step 302: A terminal starts an application, obtains a first operation, triggers scanning the second information identification code, and obtains through parsing the second information in the second information identification code.

Herein, in an example of FIG. 6, after starting a social application (such as a WeChat application), the terminal performs an operation of scanning the login-state two-dimensional code on a user interface (as shown in FIG. 7) of the social application, triggers scanning the login-state two-dimensional code, and obtains through parsing the dyeing code representing the channel information and the hash value representing the terminal user account from the login-state two-dimensional code.

Step 303: The terminal receives an information service interface promoted by the server, triggers a corresponding third operation according to second prompt information in the information service interface, and generates a second request, the second request carrying the second information.

Herein, in an example of FIG. 6, after receiving the second prompt information (such as an account binding prompt) on the user interface (as shown in FIG. 7) of the social application, the terminal triggers a corresponding auto-association operation and generates a binding request for automatically associating a user account (such as a QQ account) and a personal WeChat account of a user (such as an advertiser), the binding request carrying at least the hash value representing the terminal user account, so as to obtain through conversion the terminal user account by a background server by using the hash value, implementing auto-association operation. As a result, a subscription message can be pushed to the user by using the associated personal WeChat account of the user. Certainly, the binding request may also carry the dyeing code representing the channel information and the hash value representing the terminal user account. In this way, conversion information (such as channel conversion information, specifically conversion information such as from which channels which users obtain the dyeing two-dimensional code and a total user quantity of these users) of a channel information source may also be tracked and obtained according to the dyeing code.

Herein, the dyeing two-dimensional code may also be a non-login-state two-dimensional code, distinguishable from a subsequent login-state two-dimensional code. An application scenario corresponding to the non-login-state two-dimensional code includes a situation in which when a user (such as an advertiser) is not registered yet and is only in a state of following the official account of the WeChat advertisement social information, the user only becomes a follower of the official account of the WeChat advertisement social information. In this case, because registration is not conducted by using a user account (such as a QQ account) of the user, the user account (such as a QQ account) is not associated with a personal WeChat account of the user.

An application scenario corresponding to the login-state two-dimensional code includes a situation in which after the user follows the official account of the WeChat advertisement social information, the user has become a follower of the official account of the WeChat advertisement social information and has registered user personal information or once has a login record in the official account of the WeChat advertisement social information. In this case, because registration is conducted by using the user account (such as a QQ account) of the user, the user account (such as a QQ account) is automatically associated with the personal WeChat account of the user. Therefore, a subsequent user pushes information needed by the user to the user by using the personal WeChat account of the user in a preset manner (e.g., regularly or periodically).

Step 304: The server receives the second request, identifies a terminal user account corresponding to the second information according to a preset policy, establishes an association between the terminal user account and an application service account of the terminal user account, to push followed information to the terminal user by using the application service account, and tracks and obtains a user behavior of the terminal user in the application service account according to the second information.

Herein, in an example of FIG. 6, after the server receives the binding request, because considering user information security, a user real account is not transmitted, but the hash value representing the terminal user account and corresponding to the account is transmitted, the hash value needs to be converted at a server side, to obtain the user real account. Encryption of the user real account and decryption of the hash value to obtain the user real account may both be implemented at the server side. After the user real account is obtained through decryption, the user account (such as a QQ account) and the personal WeChat account of the user (such as an advertiser) are automatically associated, so as to push a subscription message to the user by using the associated personal WeChat account of the user, and track, according to the established association, a user behavior of the user that is based on the user real account.

Herein, the followed information pushed to the terminal user includes, for example but not limited thereto: at least one piece of information of a promotion effect of the information, a conversion rate of the information, and consumption (or utilization) of a terminal user account, so that a subsequent user (such as an advertiser) obtains the promotion effect of the information, the conversion rate of the information, and consumption of the terminal user account in the account from the WeChat service account of the user, so as to fully understand a promotion status of a user account, processing an emergency according to the promotion status, and the like.

Step 305: The server records the first information and tracks and obtains conversion information of the information source according to the first information.

The conversion information of the information source includes, for example but not limited thereto: a user quantity of terminal users that are converted into at least one terminal by using at least one information channel, that is, tracking and collecting statistics on, according to the first information, the user quantity of advertisers that are converted by channels into a mobile terminal.

Embodiment 4

An exemplary embodiment provides an information processing method, the method including:

Step 401: Encrypt a terminal user account according to an encryption policy locally stored in a server, to obtain second information.

Herein, the server locally stores a decryption policy corresponding to the encryption policy, so as to subsequently decrypt the second information (such as a hash value corresponding to the terminal user account) to obtain the terminal user account. The terminal user account may be a user real account (such as a QQ account). An advantage of the processing according to an exemplary embodiment is: security and privacy in transmission of user information can be ensured.

Step 402: A server generates a second information identification code according to first information representing an information source and second information representing a terminal user account.

Herein, as shown in FIG. 6, using an example in which the information source is channel information, a login-state two-dimensional code is generated according to a dyeing code representing the channel information and a hash value representing the terminal user account. The channel information is promotion channel information corresponding to promotion of an advertisement platform that needs to be followed, and is, for example, an advertisement promotion website. The second information representing the terminal user account is a hash value corresponding to the terminal user account and is not real user information (such as a QQ account).

Step 403: A terminal starts an application, obtains a first operation, triggers scanning the second information identification code, and obtains through parsing the second information in the second information identification code.

Herein, in an example of FIG. 6, after starting a social application (such as a WeChat application), the terminal performs an operation of scanning the login-state two-dimensional code on a user interface (as shown in FIG. 7) of the social application, triggers scanning the login-state two-dimensional code, and obtains through parsing the dyeing code representing the channel information and the hash value representing the terminal user account from the login-state two-dimensional code.

Step 404: The terminal receives an information service interface promoted by the server, triggers a corresponding third operation according to second prompt information in the information service interface, and generates a second request, the second request carrying the second information.

Herein, in an example of FIG. 6, after receiving the second prompt information (such as an account binding prompt) on the user interface (as shown in FIG. 7) of the social application, the terminal triggers a corresponding auto-association operation and generates a binding request for automatically associating a user account (such as a QQ account) and a personal WeChat account of a user (such as an advertiser), the binding request carrying at least the hash value representing the terminal user account, so as to obtain through conversion the terminal user account by a background server by using the hash value, implementing auto-association operation.

As a result, a subscription message can be pushed to the user by using the associated personal WeChat account of the user. Certainly, the binding request may also carry the dyeing code representing the channel information and the hash value representing the terminal user account. In this way, conversion information (such as channel conversion information, specifically conversion information such as from which channels which users obtain the dyeing two-dimensional code and a total user quantity of these users) of a channel information source may also be tracked and obtained according to the dyeing code.

Herein, the dyeing two-dimensional code may also be a non-login-state two-dimensional code, distinguishable from a subsequent login-state two-dimensional code. An application scenario corresponding to the non-login-state two-dimensional code includes a situation in which when a user (such as an advertiser) is not registered yet and is only in a state of following the official account of the WeChat advertisement social information, the user only becomes a follower of the official account of the WeChat advertisement social information. In this case, because registration is not conducted by using a user account (such as a QQ account) of the user, the user account is not associated with a personal WeChat account of the user.

An application scenario corresponding to the login-state two-dimensional code includes a situation in which after the user follows the official account of the WeChat advertisement social information, the user has become a follower of the official account of the WeChat advertisement social information and has registered user personal information or once has a login record in the official account of the WeChat advertisement social information. In this case, because registration is conducted by using the user account (such as a QQ account) of the user, the user account is automatically associated with the personal WeChat account of the user. Therefore, a subsequent user pushes information needed by the user to the user by using the personal WeChat account of the user in a preset manner (e.g., regularly or periodically).

Step 405: The server receives the second request, decrypts the second information according to a decryption policy corresponding to the encryption policy locally stored in the server, and identifies a terminal user account corresponding to the second information.

Step 406: Obtain the application service account of the terminal user, establish an association between the terminal user account and the application service account, to push followed information to the terminal user by using the application service account, and track and obtain a user behavior of the terminal user in the application service account according to the second information.

Herein, in an example of FIG. 6, an actual application of steps 405 to 406 is described: after the server receives the binding request, a user real account is not transmitted to ensure security of user information, but the hash value representing the terminal user account and corresponding to the account is transmitted, the hash value needs to be converted at a server side, to obtain the user real account. Encryption of the user real account and decryption of the hash value to obtain the user real account may both be implemented at the server side. After the user real account is obtained through decryption, the user account (such as a QQ account) and the personal WeChat account of the user (such as an advertiser) are automatically associated, so as to push a subscription message to the user by using the associated personal WeChat account of the user, and track, according to the established association, a user behavior of the user that is based on the user real account.

Herein, the followed information pushed to the terminal user includes, but not limited to: at least one piece of information of a promotion effect of the information, a conversion rate of the information, and consumption of a terminal user account, so that a subsequent user (such as an advertiser) obtains the promotion effect of the information, the conversion rate of the information, and consumption of the terminal user account in the account from the WeChat service account of the user, so as to fully understand a promotion status of a user account, processing an emergency according to the promotion status, and the like.

Step 407: The server records the first information and tracks and obtains conversion information of the information source according to the first information.

The conversion information of the information source includes, but not limited to: a user quantity of terminal users that are converted into at least one terminal by using at least one information channel, that is, tracking and collecting statistics on, according to the first information, the user quantity of advertisers that are converted by channels into a mobile terminal.

Embodiment 5

Figure 8:
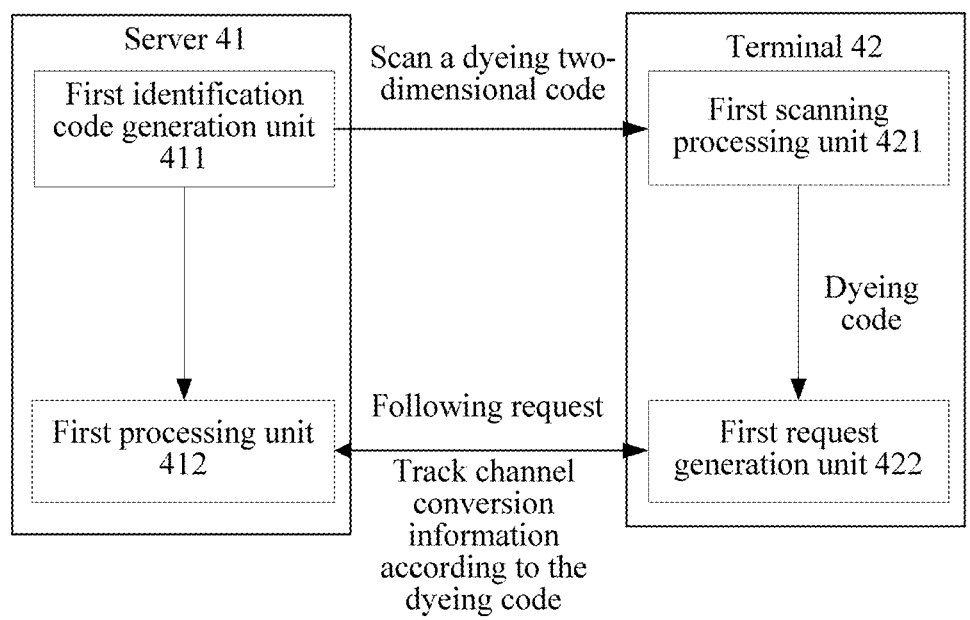
FIG. 8 is a schematic diagram of a system architecture according to Embodiment 5.

An exemplary embodiment provides an information processing system. FIG. 8 is a schematic diagram of a system architecture according to Embodiment 5.

As shown in FIG. 8, the system includes a server 41 and a terminal 42. The server 41 includes: a first identification code generation unit 411, configured to generate a first information identification code according to first information representing an information source; and a first processing unit 412, configured to: receive a first request and accept following of an information service from a terminal user; and record the first information and track and obtain conversion information of the information source according to the first information. The terminal 42 includes: a first scanning processing unit 421, configured to start, at a terminal, an application, obtain a first operation, trigger scanning the first information identification code, and obtain through parsing the first information in the first information identification code; and a first request generation unit 422, configured to receive an information service interface promoted by the server, trigger a corresponding second operation according to first prompt information in the information service interface, and generate the first request, the first request carrying the first information.

In an actual application of an exemplary embodiment, as shown in FIG. 3, using an example in which the information source is channel information, a dyeing identification code (or referred to as a dyeing two-dimensional code) in a two-dimensional code form is generated according to a dyeing code representing the channel information. The channel information is promotion channel information corresponding to promotion of an advertisement platform that needs to be followed, and is, for example, an advertisement promotion website. After starting the social application (such as a WeChat application), the terminal performs an operation of scanning the dyeing two-dimensional code on a user interface (as shown in FIG. 4) of the social application, triggers scanning the dyeing two-dimensional code, and obtains through parsing the dyeing code representing the channel information from the dyeing two-dimensional code.

After receiving the first prompt information (such as prompt information prompting whether to follow an official account of WeChat advertisement social information) on the user interface (as shown in FIG. 4) of the social application, the terminal triggers a corresponding following operation, and generates a follow request for following a WeChat advertisement social information service, the follow request carrying the dyeing code. The server receives the follow request, accepts following of the WeChat advertisement social information from the terminal user, and records the dyeing code, to successfully implement dyeing processing, so as to subsequently track and obtain conversion information (such as channel conversion information, specifically conversion information such as from which channels which users obtain the dyeing two-dimensional code and a total user quantity of these users) of a channel information source according to the dyeing code.

In an implementation, the conversion information of the information source includes, but not limited to: a user quantity of terminal users that are converted into at least one terminal by using at least one information channel.

In an implementation, the server further includes: a first identification unit, configured to identify the terminal user according to the first information to obtain an information source of the first information identification code.

Embodiment 6

Figure 9:
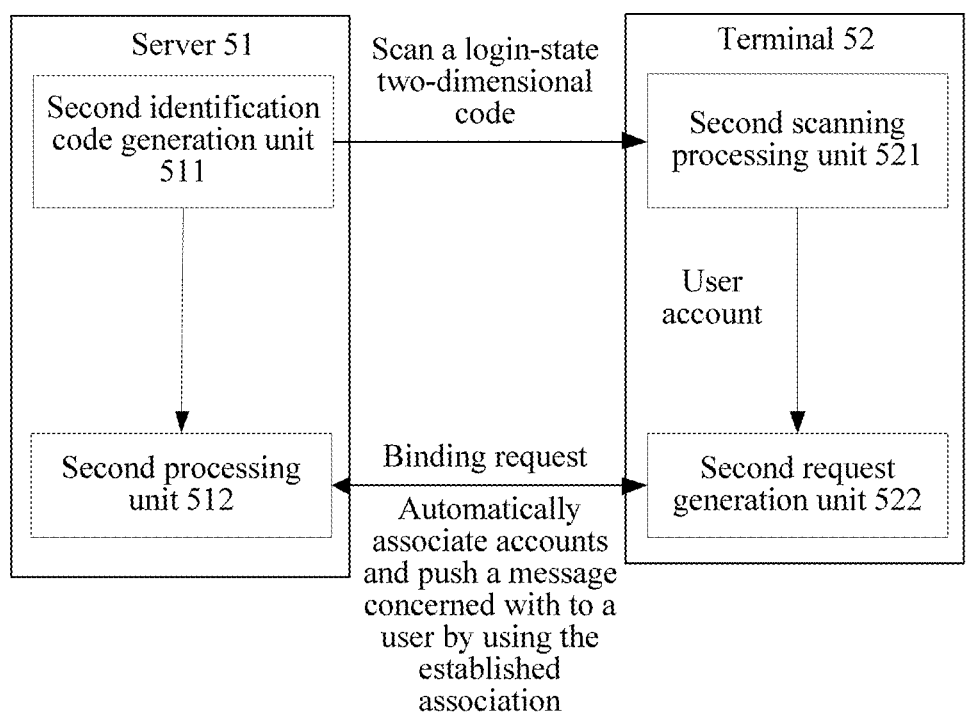
FIG. 9 is a schematic diagram of a system architecture according to Embodiment 6.

An exemplary embodiment provides an information processing system. FIG. 9 is a schematic diagram of a system architecture according to Embodiment 6.

As shown in FIG. 9, the system includes a server 51 and a terminal 52. The server 51 includes: a second identification code generation unit 511, configured to generate a second information identification code according to the first information representing the information source and second information representing a terminal user account after obtaining the first information representing the information source; and a second processing unit 512, configured to: receive a second request; and identify a terminal user account corresponding to the second information according to a preset policy, establish an association between the terminal user account and an application service account of the terminal user account, to push followed information to the terminal user by using the application service account, and track and obtain a user behavior of the terminal user in the application service account according to the second information. The terminal 52 includes: a second scanning processing unit 521, configured to start, at a terminal, an application, obtain a first operation, trigger scanning the second information identification code, and obtain through parsing the second information in the second information identification code; and a second request generation unit 522, configured to receive an information service interface promoted by the server, trigger a corresponding third operation according to second prompt information in the information service interface, and generate the second request, the second request carrying the second information.

In an actual application of an exemplary embodiment, as shown in FIG. 6, using an example in which the information source is channel information, a login-state two-dimensional code is generated according to a dyeing code representing the channel information and a hash value representing the terminal user account. The channel information is promotion channel information corresponding to promotion of an advertisement platform that needs to be followed, and is, for example, an advertisement promotion website. The second information representing the terminal user account is a hash value corresponding to the terminal user account and is not real user information (such as a QQ account).

After starting a social application (such as a WeChat application), the terminal performs an operation of scanning the login-state two-dimensional code on a user interface (as shown in FIG. 7) of the social application, triggers scanning the login-state two-dimensional code, and obtains through parsing the dyeing code representing the channel information and the hash value representing the terminal user account from the login-state two-dimensional code. After receiving the second prompt information (such as an account binding prompt) on the user interface (as shown in FIG. 7) of the social application, the terminal triggers a corresponding auto-association operation and generates a binding request for automatically associating a user account (such as a QQ account) and a personal WeChat account of a user (such as an advertiser), the binding request carrying at least the hash value representing the terminal user account, so as to obtain through conversion the terminal user account by a background server by using the hash value, implementing auto-association operation. As a result, a subscription message can be pushed to the user by using the associated personal WeChat account of the user. Certainly, the binding request may also carry the dyeing code representing the channel information and the hash value representing the terminal user account. In this way, conversion information (such as channel conversion information, specifically conversion information such as from which channels which users obtain the dyeing two-dimensional code and a total user quantity of these users) of a channel information source may also be tracked and obtained according to the dyeing code.

After the server receives the binding request, a user real account is not transmitted to ensure security of user information, but the hash value representing the terminal user account and corresponding to the account is transmitted, the hash value needs to be converted at a server side, to obtain the user real account. Encryption of the user real account and decryption of the hash value to obtain the user real account may both be implemented at the server side. After the user real account is obtained through decryption, the user account (such as a QQ account) and the personal WeChat account of the user are automatically associated, so as to push a subscription message to the user by using the associated personal WeChat account of the user, and track, according to the established association, a user behavior of the user that is based on the user real account.

In an example implementation, the followed information pushed to the terminal user includes, but not limited to: at least one piece of information of a promotion effect of the information, a conversion rate of the information, and consumption of a terminal user account.

In an example implementation, the server further includes: an encryption unit, configured to encrypt the terminal user account according to an encryption policy locally stored in the server, to obtain the second information.

In an example implementation, the second processing unit is further configured to: locally store, at the server, a decryption policy corresponding to the encryption policy; decrypt the second information according to the decryption policy, to obtain a terminal user account corresponding to the second information; obtain the application service account of the terminal user; and establish an association between the terminal user account and the application service account.

In an example implementation, the second request further carries the first information; the server further includes a first processing unit, configured to record the first information and track and obtain conversion information of the information source according to the first information.

In an example implementation, the conversion information of the information source includes, but not limited to: a user quantity of terminal users that are converted into at least one terminal by using at least one information channel.

In an example implementation, the server further includes: a first identification unit, configured to identify the terminal user according to the first information to obtain an information source of the first information identification code.

Embodiment 7

It should be noted herein that the aforementioned terminal may be an electronic device such as a PC, or may be a portable electronic device such as a PAD, a tablet computer and a laptop, or may be a smart mobile terminal such as a mobile phone, which is not limited to the description herein. The server may be provided by using a cluster system and is an electronic device in which units are merged into one to implement functions of the units or in which unit functions are separately disposed. The terminal and the server may respectively include at least a database for storing data and a processor for data processing, or include a storage medium disposed within the server or an independently disposed storage medium.

For the processor for data processing, when the processor executes processing, processing may be implemented by using a micro-processor, a CPU, a DSP, or an FPGA. For the storage medium, the storage medium includes operation instructions, the operation instructions may be computer executable code, and steps in a process of the foregoing information processing method in exemplary embodiments are implemented by the operation instructions.

Figure 10:
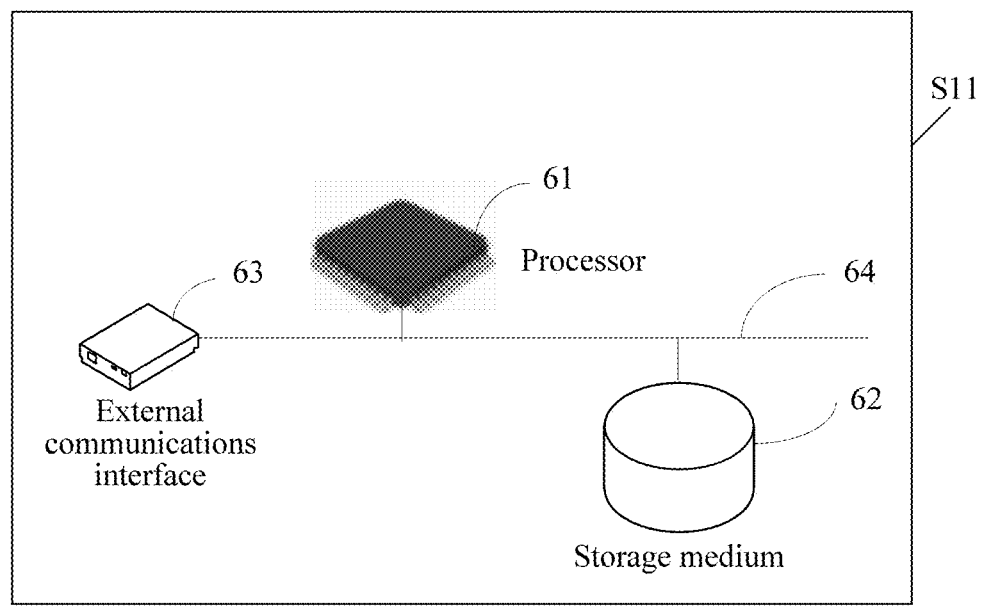
FIG. 10 is a schematic diagram of a hardware architecture according to Embodiment 7.

FIG. 10 is a schematic diagram of a hardware architecture according to Embodiment 7.

An example in which the terminal and the server are used as hardware entities S11 is shown in FIG. 10. The apparatus includes a processor 61, a storage medium 62, and at least one external communications interface 63. The processor 61, the storage medium 62, and the external communications interface 63 are connected to each other by using a bus 64.

It should be noted herein that the foregoing descriptions involving the terminal and the server are similar to descriptions of the foregoing method and have the same beneficial effects as the descriptions of the method, which are not described again. For details not disclosed in the exemplary terminal and server embodiments, refer to the descriptions of the exemplary method embodiments described above.

The exemplary embodiments are described by using an application scenario as an example:

First, the situation in which a user in the application scenario is a brand advertiser or a medium or small advertiser, or after successfully following a WeChat service official account, becomes a brand advertiser or a medium or small advertiser of a WeChat service platform follower is described. An exemplary embodiment is used in the application scenario, and is specifically, a technical solution for tracking an advertiser based on a two-dimensional code. The brand advertiser or medium or small advertiser is collectively referred to as an "advertiser".

Abbreviations involved in the application scenario are: 1) advertiser: a main body for releasing an advertisement; 2) dyeing code: dyeing is an important specimen tracking method in biology, and refers to identifying a user in this text according to the concept, that is, "dyeing" a user, and a code for identifying a user is a dyeing code; 3) login-state two-dimensional code: a two-dimensional code carrying login information of an advertiser and a dyeing code; 4) dyeing two-dimensional code: a two-dimensional code carrying a dyeing code; when a user scans the dyeing two-dimensional code and becomes a follower, a system records a dyeing code of the two-dimensional code, successfully "dyeing" the user; 5) consumption of an advertisement: an amount of money consumed by an advertiser releasing an advertisement. More consumption within a limit set by the advertiser means more exposure of the advertisement and more favors the advertiser.

In this application scenario, according to the related art technology, common technical solutions for tracking a user conversion source are: 1) carrying a source parameter by using a uniform resource locator (URL); 2) sharing cookies, that is, Cookies, which refer to data, usually encrypted data, that is stored on a local terminal of a user to distinguish a user identity and track a session. The two methods, the URL and cookies, both have suitable scenarios thereof but cannot well adapt to demands of data tracking, data synchronization, and data real-time update in a scenario across terminals (e.g., a PC terminal and a mobile terminal). Two-dimensional codes (e.g., a dyeing two-dimensional code and a login-state two-dimensional code) used in the exemplary embodiments are based on a natural manner of interaction between the mobile terminal and the PC terminal and can satisfy an across-terminal (e.g., a PC terminal and a mobile terminal) demand.

A social application (such as WeChat), as popular social software, has become an important message access mode. According to exemplary embodiments, a message that an advertiser is concerned with may be automatically pushed to a WeChat account of the advertiser, to better provide a service to the advertiser. There are mass quantities of advertisers, especially mid to long tail advertisers, which are mostly corporation principals or have a special person that is responsible for promotion of advertisements. These advertisers are more concerned with a promotion effect, a conversion rate, consumption of an account, and the like. These advertisements are eager to simply and quickly learn of a promotion status of an account and learn of and deal with an emergency (such as an inadequate account fund) anytime anywhere, thereby tracking dynamic change of data in real time. According to exemplary embodiments, the objective can be achieved by using the message access mode of WeChat, thereby tracking dynamic change of data in real time.

Because an advertiser usually operates and manages this account on a PC terminal rather than a mobile terminal, messages are accessed mostly in a conventional non-real-time manner such as a notification and an email within a system, although a short message service message is a very good real-time message access mode, message content is limited. The advertiser's account and a personal WeChat account of the advertiser can be simply and quickly automatically associated and a message access passage can be get through by using the message access mode relying on WeChat in exemplary embodiments, so as to continuously track advertiser channel information, channel conversion information, a user behavior, and the like in real time.

In this application scenario, according to exemplary embodiments, the following content is specifically included:

I. A two-dimensional code is generated at a server side, and the generated two-dimensional code includes two types: 1) a dyeing two-dimensional code (or referred to as a non-login-state two-dimensional code); 2) a login-state two-dimensional code.

Herein, for the dyeing two-dimensional code, the dyeing two-dimensional code carries a dyeing code. When a user scans the dyeing two-dimensional code and becomes a follower, the system records the dyeing code of the two-dimensional code, thereby successfully "dyeing" the user.

Herein, for the login-state two-dimensional code, the login-state two-dimensional code carries login information of an advertiser and the dyeing code. The login-state two-dimensional code is also a dyeing two-dimensional code. The login information is sensitive information and is not encoded into the two-dimensional code. The login information contained in the login-state two-dimensional code is an encrypted hash index value. Real login information is obtained by performing querying in the background by using a decrypted hash index value.

Figure 11:
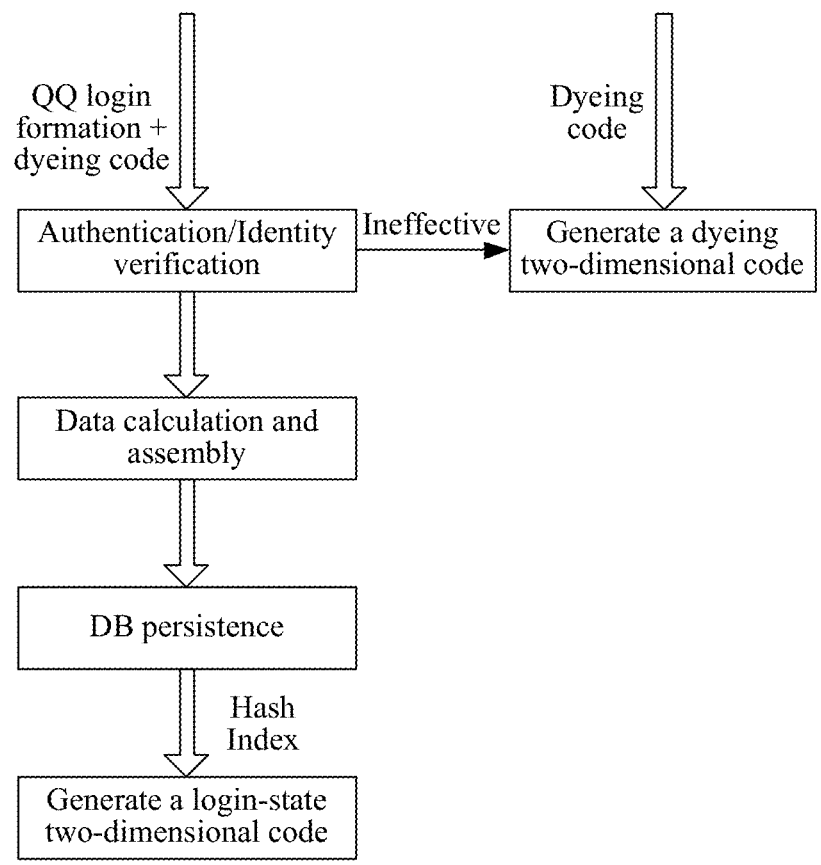
FIG. 11 is a schematic diagram of an application scenario in which a two-dimensional code is generated according to an exemplary embodiment.

FIG. 11 is a schematic diagram of an application scenario in which a two-dimensional code is generated according to an exemplary embodiment.

Processes of generating the two-dimensional code are shown in FIG. 11, and include a process of generating the login-state two-dimensional code and a process of generating the dyeing two-dimensional code. In the process of generating the login-state two-dimensional code, authentication/identity verification needs to be performed, to determine whether an operation of the advertiser himself or not. When the login-state two-dimensional code is generated according to information (such as QQ login information) about the terminal user account and the dyeing two-dimensional code, data calculation and assembly and DB persistence processing need to be performed, the information about the terminal user account also needs to be encrypted into a hash value (Hash) for storage, and at last, the login-state two-dimensional code is generated according to the hash value and the dyeing code. The process of generating the dyeing two-dimensional code does not involve authentication and identity verification because the purpose of dyeing is to determine from which third-party channel the advertiser obtains the dyeing code.

Figure 12:
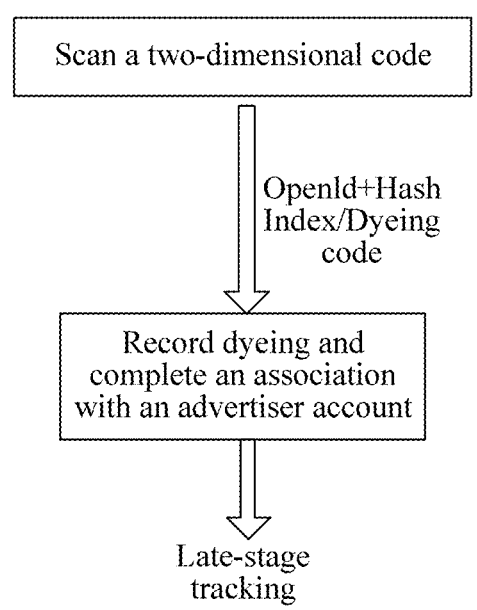
FIG. 12 is a schematic diagram of an application scenario in which a two-dimensional code is scanned according to an exemplary embodiment.

FIG. 12 is a schematic diagram of an application scenario in which a two-dimensional code is scanned according to an exemplary embodiment.

Processes of scanning the two-dimensional code are shown in FIG. 12 and include a process of scanning the login-state two-dimensional code and a process of scanning the dyeing two-dimensional code. In the process of scanning the login-state two-dimensional code, the server needs to decrypt the hash value (Hash) into the information (such as QQ login information) about the terminal user account, and then establishes an auto-association between the information about the terminal user account and a user WeChat account. In the process of scanning the dyeing two-dimensional code, after the dyeing code is obtained through parsing, the dyeing code is dyed, so as to record from which third-party channel the user obtains the dyeing two-dimensional code.

The dyeing code is self-defined, and different dyeing codes may be defined according to tracked objects. The dyeing code may a number, a website, or a character string, and any character string is supported in designs. Some readable and meaningful dyeing codes may be predefined in services. The OpenId is a character string of a WeChat user that is uniformly identified by a WeChat official account. The Hash Index is an index value of login information data. The login data is sensitive information and cannot be directly encoded into the two-dimensional code. The login-state two-dimensional code includes only the Hash index, and related data information is stored in the background.

It should be noted that considering an objective of resistance to attack, the login-state two-dimensional code is not limitlessly generated, a quantity of two-dimensional codes are controlled according to account information and the dyeing code, and non-conflict of the two-dimensional codes is also ensured. Login information carried in each login-state two-dimensional code has been verified, ensuring effectiveness of the login-state two-dimensional code.

II. After the terminal the two-dimensional code, the server tracks user conversion and an advertiser behavior in real time.

First, codes need to be arranged in various channels. After scanning the two-dimensional code and becoming a follower of WeChat, the user is tracked in a whole course by using the dyeing code. The follower scanning the login-state two-dimensional code is automatically associated with an advertiser account carried in the login-state two-dimensional code, the advertiser does not need to manually associate WeChat and an advertisement account. In this way, real-time access of advertiser information is implemented, and the user perceives only the action of scanning the code and an account binding prompt. A source of the advertiser and all behaviors of the advertiser in the service account, including supplement and modification of qualification information and operations of various loops of binding the advertisement account, may be tracked in the background according to parameters, so as to obtain through analysis the quality and a user portrait of each source advertiser.

According to exemplary embodiments, a quantity of followers converted into the mobile terminal in the channels may be tracked and counted; the code is scanned to automatically associate the advertiser account, automatically pushing an account message in a late stage (or later stage); all converted followers and advertisers are dyed, implementing continuous tracking.

In this application scenario, according to exemplary embodiments, the login-state two-dimensional code includes the channel information and the user information, but the dyeing two-dimensional code includes only the channel information. Advertiser tracking implemented in forms of the dyeing two-dimensional code and the login-state two-dimensional code includes but is not limited to the following content: a conversion rate of conversion from followers into advertisers, activity of conversion into advertisers, advertisement consumption, an advertiser charge rate/charge quota, a late-stage (or later stage) loss rate, late-stage (or later-stage) orientation of followers not converted into advertisers, and the like.

To make more advertisers join in the WeChat platform, information promotion is performed by using technical content in the foregoing embodiments, so that real-time tracking, data synchronization and data update of brand advertisers and medium and small advertisers are more accurate, a processing efficiency is high, and costs are saved. For brand advertisers, as large advertisers, great efforts are made to track the brand advertisers. For medium and small advertisers, although great efforts do not need to be made to track the medium and small advertisers, because there is a large quantity of medium and small advertisers, the medium and small advertisers also need to be tracked. However, if medium and small advertisers are to be tracked in a way same as the way of tracking the large advertisers, high costs are required.

To solve these problems, in an actual application according to exemplary embodiments, to make more advertisers join in the WeChat platform, advertiser channels may be converted and tracked based on the two-dimensional code (which is not limited to the login-state two-dimensional code, and the dyeing two-dimensional code may also be used). User conversion and tracking implemented in the form of the dyeing two-dimensional code is based on an advertiser auto-association technology of the two-dimensional code (which is limited merely to the login-state two-dimensional code), and auto-association of advertisers implemented in the form of the login-state two-dimensional code is based on an advertiser tracking technology based on the two-dimensional code (which is not limited to the login-state two-dimensional code, and the dyeing two-dimensional code may also be used). Therefore, these technologies according to exemplary embodiments solve the foregoing problem in the related art.

An exemplary embodiment further provides a computer storage medium, the computer storage medium storing computer executable instructions, and the computer executable instructions being configured to perform the foregoing information processing method.

In the several embodiments provided in this application, it should be understood that the disclosed apparatus and method may be implemented in other manners. The described device embodiments are merely exemplary. For example, the unit division is a merely logical function division and may be other division manners during actual implementation. For example, multiple units or components may be combined or integrated into another system, or some features may be ignored or not executed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The parts displayed as units may be or may not be physical units. That is, the units may be located in a same place, or may be distributed to multiple network units. Some or all of the units are selected according to actual requirements to achieve the objective of the solutions of exemplary embodiments.

In addition, the functional units in exemplary embodiments may be integrated into one processing unit, or each of the units may be used a unit alone, or two or more units may be integrated into one unit. The integrated units may be implemented in the form of hardware, or may be implemented in the form of a hardware and software functional unit.

A person of ordinary skill in the art may understand that all or some of steps for implementing the method embodiments may be completed by using hardware related to a program instruction. The program may be stored in a computer readable storage medium. When the program is executed, the steps of the method embodiments are performed. However, the storage medium includes various types of media that can store program code, for example, a mobile storage device, a read-only memory (ROM), a random access memory (RAM), a magnetic disk, or an optical disc.

Alternatively, if the foregoing integrated units are implemented in a form of software functional modules and are sold or used as independent products, the units may be stored in a computer readable storage medium. Based on such understanding, the technical solutions of exemplary embodiments essentially or the part contributing to the related art technology may be implemented in a form of a software product. The computer software product is stored in a storage medium and includes several instructions for instructing a computer device (which may be a personal computer, a server, a network device, or the like) to perform all or some of the methods in exemplary embodiments. The foregoing storage medium includes: any media that can store program code, such as a mobile storage device, a ROM, a RAM, a magnetic disk, or an optical disc.

The foregoing descriptions are merely specific implementations, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure should be subject to the protection scope of the claims.

According to exemplary embodiments, the server generates a first information identification code according to first information representing an information source; a terminal starts an application, obtains a first operation, triggers scanning the first information identification code, and obtains through parsing the first information in the first information identification code; the terminal receives an information service interface promoted by the server, triggers a corresponding second operation according to first prompt information in the information service interface, and generates a first request, the first request carrying the first information; the server receives the first request, accepts following of an information service from a terminal user, records the first information, and tracks and obtains conversion information of the information source according to the first information. According to exemplary embodiments, security of transmission of user information can be improved when a user conversion source is tracked, demands of data synchronization and real-time update across multiple terminals and/or across multiple platforms can also be satisfied, and it can be avoided that when the user conversion source is tracked, inaccurate tracking data is obtained due to inaccurate synchronization.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

As above, a few embodiments have been shown and described. Exemplary embodiments and advantages are merely exemplary and are not to be construed as limiting the inventive concept. The present teaching can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. An information processing method, performed by a server, the method comprising:
generating a first information identification code comprising a dyeing code, the dyeing code representing an information source, and providing the first information identification code via a first terminal;
providing an information service interface of an application to a second terminal based on a scanning operation, by the second terminal which runs the application, of the first information identification code;
receiving a first request from the second terminal, in response to a triggering operation on first prompt information provided on the information service interface, and allowing a terminal user of the second terminal to follow an information service, associated with the first information identification code, provided via the application, the first request carrying the dyeing code; and
recording the dyeing code and tracking and obtaining conversion information of the information source according to the dyeing code,
the method further comprising:
in response to the terminal user of the second terminal being registered with an application service account in the application by using a terminal user account:
encrypting the terminal user account into a hash value according to a preset encryption policy that is stored locally in the server; and
generating a second information identification code comprising the dyeing code representing the information source and the encrypted hash value, wherein the application service account being used to push followed information to the terminal user;
providing the second information identification code to the second terminal via a third terminal;
in response to a scanning operation, by the second terminal, of the second information identification code, and a triggering operation on second prompt information provided on the information service interface, receiving a second request from the second terminal, the second request carrying the encrypted hash value and being an account binding request;
decrypting the encrypted hash value according to a preset decryption policy, which corresponds to the preset encryption policy and is locally stored in the server, and identifying the terminal user account according to the decrypted hash value; and
automatically establishing an association between the terminal user account and the application service account, and tracking and obtaining a user behavior of the terminal user in the application service account based on the terminal user account.

2. The method according to claim 1, wherein the conversion information of the information source comprises: a quantity of terminal users that are converted into at least one terminal by using at least one information channel.

3. The method according to claim 1, further comprising: identifying the terminal user according to the dyeing code to obtain the information source corresponding to the first information identification code.

4. The method according to claim 1, wherein the followed information pushed to the terminal user comprises information about at least one from among: a promotion effect of the followed information, a conversion rate of the followed information, and consumption of the terminal user account.

5. The method according to claim 1, wherein the second request further carries the dyeing code, to track and obtain the conversion information of the information source according to the dyeing code.

6. The method according to claim 5, wherein the conversion information of the information source comprises at least one from among: a quantity of terminal users that are converted into at least one terminal by using at least one information channel.

7. The method according to claim 5, further comprising: identifying the terminal user according to the dyeing code to obtain the information source corresponding to the first information identification code.

8. The method according to claim 1, wherein the first request is based on scanning of the first information identification code.

9. A server, the server comprising:
at least one memory operable to store program code; and
at least one processor operable to read the program code, and operate as instructed by the program code, the program code including:
  first identification code generation code configured to cause at least one of said at least one processor to generate a first information identification code comprising a dyeing code, the dyeing code representing an information source; provide the first information identification code via a first terminal; and provide an information service interface of an application to a second terminal based on a scanning operation, by the second terminal which runs the application, of the first information identification code; and
  first processing code configured to cause at least one of said at least one processor to:
    receive a first request from the second terminal, in response to a triggering operation on prompt information provided on the information service interface; allow a terminal user of the second terminal to follow an information service, associated with the first information identification code, provided via the application, the first request carrying the dyeing code; and record the dyeing code and track and obtain conversion information of the information source according to the dyeing code,
  wherein the program code further comprises:
    second identification code generation code configured to cause at least one of said at least one processor to, in response to the terminal user of the second terminal being registered with an application service account in the application by using a terminal user account:
      encrypt the terminal user account into a hash value according to a preset encryption policy that is stored locally in the server; and
      generate a second information identification code according to the dyeing code representing the information source and the encrypted hash value, wherein the application service account being used to push followed information to the terminal user; and
    second processing code configured to cause at least one of said at least one processor to:
      in response to a scanning operation, by the second terminal, of the second information identification code, and a triggering operation on second prompt information provided on the information service interface, receive a second request from the second terminal, the second request carrying the encrypted hash value and being an account binding request;
      decrypt the encrypted hash value according to a preset decryption policy, which corresponds to the preset encryption policy and is locally stored in the server, and identify the terminal user account according to the decrypted hash value; and
      automatically establish an association between the terminal user account and the application service account, and track and obtain a user behavior of the terminal user in the application service account based on the terminal user account.

10. The server according to claim 9, wherein the conversion information of the information source comprises: a quantity of terminal users that are converted into at least one terminal by using at least one information channel.

11. The server according to claim 9, wherein the program code further comprises:
  identifying code configured to cause at least one of said at least one processor to identify the terminal user according to the dyeing code to obtain the information source corresponding to the first information identification code.

12. The server according to claim 9, wherein the followed information pushed to the terminal user comprises information of at least one from among: a promotion effect of the followed information, a conversion rate of the followed information, and consumption of the terminal user account.

13. The server according to claim 9, wherein the second request further carries the dyeing code, to track and obtain the conversion information of the information source according to the dyeing code.

14. The server according to claim 13, wherein the conversion information of the information source comprises at least one from among: a quantity of terminal users that are converted into at least one terminal by using at least one information channel.

15. The server according to claim 13, wherein the second processing code further causes at least one of said at least one processor to identify the terminal user according to the dyeing code to obtain the information source corresponding to the first information identification code.

16. The server according to claim 9, wherein the first request is based on scanning of the first information identification code.

17. A non-transitory computer storage medium, the computer storage medium storing computer executable instructions, which, when executed by a computing apparatus of a server, cause the computing apparatus to:
  generate a first information identification code comprising a dyeing code, the dyeing code representing an information source, and provide the first information identification code via a first terminal;
  provide an information service interface of an application to a second terminal based on a scanning operation, by the second terminal which runs the application, of the first information identification code;
  receive a first request from the second terminal, in response to a triggering operation on prompt information provided on the information service interface, and allow a terminal user of the second terminal to follow an information service, associated with the first information identification code, provided via the application, the first request carrying the dyeing code; and
  record the dyeing code and track and obtain conversion information of the information source according to the dyeing code,
  wherein the computer executable instructions, when executed by the computing apparatus, further cause the computing apparatus to:
  in response to the terminal user of the second terminal being registered with an application service account in the application by using a terminal user account:
    encrypt the terminal user account into a hash value according to a preset encryption policy that is stored locally in the server; and
    generate a second information identification code according to the dyeing code representing the information source and the encrypted hash value, wherein the application service account being used to push followed information to the terminal user;
  provide the second information identification code to the terminal;

in response to a scanning operation, by the terminal, of the second information identification code, and a triggering operation on second prompt information provided on the information service interface, receive a second request from the terminal, the second request carrying the encrypted hash value and being an account binding request;

decrypt the encrypted hash value according to a preset decryption policy, which corresponds to the preset encryption policy and is locally stored in the server, and identify the terminal user account according to the decrypted hash value; and automatically establish an association between the terminal user account and the application service account, and track and obtain a user behavior of the terminal user in the application service account based on the terminal user account.

\* \* \* \* \*